US007881967B1

(12) United States Patent
Srinivasan et al.

(10) Patent No.: US 7,881,967 B1
(45) Date of Patent: Feb. 1, 2011

(54) METHOD OF PRODUCT CONFIGURATION VALIDATION

(75) Inventors: Subramanian Srinivasan, San Jose, CA (US); Deepak Bhargava, Sunnyvale, CA (US); Rama Chinta, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1995 days.

(21) Appl. No.: 10/367,354

(22) Filed: Feb. 14, 2003

(51) Int. Cl.
*G06Q 30/00* (2006.01)
*H04L 12/28* (2006.01)
*G06F 15/177* (2006.01)

(52) U.S. Cl. .......................... 705/26; 370/254; 709/220
(58) Field of Classification Search .................. 705/26; 370/354
See application file for complete search history.

(56) References Cited

U.S. PATENT DOCUMENTS

| | | | | |
|---|---|---|---|---|
| 5,821,937 | A * | 10/1998 | Tonelli et al. | 715/853 |
| 5,954,797 | A * | 9/1999 | Sidey | 709/223 |
| 6,308,174 | B1 * | 10/2001 | Hayball et al. | 707/10 |
| 6,308,205 | B1 * | 10/2001 | Carcerano et al. | 709/221 |
| 6,510,139 | B1 * | 1/2003 | Yoshida | 370/238 |
| 6,954,930 | B2 * | 10/2005 | Drake et al. | 717/178 |
| 6,996,510 | B1 * | 2/2006 | Reilly et al. | 703/13 |
| 7,120,680 | B1 * | 10/2006 | Higgins et al. | 709/220 |
| 7,596,518 | B2 * | 9/2009 | Rappaport et al. | 705/29 |
| 2002/0184111 | A1 * | 12/2002 | Swanson | 705/26 |
| 2003/0093688 | A1 * | 5/2003 | Helgesen et al. | 713/200 |
| 2003/0200149 | A1 * | 10/2003 | Gonzalez et al. | 705/26 |

OTHER PUBLICATIONS

Netformx(R) Unveils First eBusiness System Designed Exclusively for the Network Communications Industry. (Dec. 11, 2000). PR Newsire,p. 1. Retrieved Jul. 2, 2010, from Business Dateline. (Document ID: 65102862).*

* cited by examiner

*Primary Examiner*—F. Ryan Zeender
*Assistant Examiner*—Scott A Zare
(74) *Attorney, Agent, or Firm*—Stolowitz Ford Cowger LLP

(57) ABSTRACT

A method of product configuration validation prior to ordering is described. The present method is comprised of receiving a product configuration transmitted from a procuring computer system. The product configuration is received by a computer system. The computer system is configured to cause the distribution of a product utilized in said product configuration to said procuring computer system. The product configuration is compared with parameters relative to functionality of said product when in said product configuration. The functionality parameters are stored on the computer system. The comparing is for validating the product configuration.

12 Claims, 11 Drawing Sheets

METHOD OF PRODUCT CONFIGURATION VALIDATION

FIELD OF THE INVENTION

The present invention relates to a method of product configuration validation. More particularly, the present invention relates to a method for validating product configuration prior to product ordering in a business to business scenario.

BACKGROUND OF THE INVENTION

Computer systems communicatively coupled in a network environment are enabled to share data among the coupled computer systems. Currently; a wide variety of networking components are available to facilitate communicative coupling of computer systems. Examples of network components can be hardware devices including, but not limited to, hubs, switches, NICs (network interface cards), routers, bridges, servers, cabling (e.g., CAT 5) to connect the devices, ROM (read only memory) chips that contain instructions for hardware devices, cooling devices for the case in which servers are located, cases for the servers, rack enclosures, etc. Other examples of network components can be, but not limited to, software code for providing instructions to hardware components, e.g., input/output software (I/O software) which controls network traffic, software tools, e.g., remote monitoring, fault detection, troubleshooting, environment condition monitoring, and the like.

Accordingly, a network component can be hardware, software, or a combination of hardware and software. Also, it is common for each network component to have certain physical, operational, and/or performance characteristics/properties associated therewith. Further, each network component may have characteristics/properties contingent upon other network components with which it is coupled and the manner in which they are configured. Accordingly, proper configuration is vital when complex network components are involved.

When a customer acquires a network component or components in conjunction with development of a network of communicatively coupled computer systems, or when acquiring components for upgrades or adding to existing networks, there are a myriad of possible options and configurations available that are dependent upon the network architecture and topology. Within a network architecture and/or topology being developed, upgraded, or increased, some network components may not be compatible with other network components.

Having incompatible components in a network can be especially disadvantageous to customers who acquire large numbers of network components, e.g., large companies and/or multi-national corporations, because the customer's network architecture would require some measure of redesigning to remedy the non-compatibility of some components, not to mention the re-initiation of the purchasing process. Redesigning a network architecture, partially or entirely, or reinitiating the purchasing process can add substantial expense to costs associated with network development and implementation.

Further disadvantageous is when a customer, e.g., a large company/corporation, needs to change or upgrade components within the existing network architecture and/or topology. Some changes to network components, e.g., hardware and/or software, or the upgrades thereof can, in some instances, render other network components coupled to the existing network inoperable. In some instances, this can require the customer to redesign their portions of their network architecture and/or topology to remedy the inoperability of some network components, which can also add substantial expense to the overall cost of maintaining the network architecture and/or topology.

In many instances, the code for a software component undergoes various changes for a wide variety of reasons, e.g., bug fixes, security patches, updates, etc. Some software component changes may not support certain network components and/or render some network components inoperable, such that the consumer may need to replace certain components. Additionally, a change in a software component may not support or may render other software components inoperable. Further disadvantageous is that, in many instances, new software components may not be compatible with some of the existing software components, thus adding substantial expense to the cost of the network.

Generally, in an electronic environment for ordering network components, when a customer, e.g., an individual, a company/corporation, an institution, etc., is developing a network or upgrading or increasing an existing network architecture and/or topology, that customer accesses a web site of a network component supplier, select components, configures the selected components and then submits the purchase order. In a B2C (business-to-customer) environment where information regarding the configuration of the network component is stored on the supplier's systems, this practice may be acceptable. Customer's interaction with the supplier is real-time and the customer can take additional measures if configurations become invalid. In this B2C scenario, the configuration of the network components is checked at the time of ordering.

However, in a B2B (business-to-business) environment, generally, the customer receives component information and pricing via a supplier's XML (extensible markup language) document/web page or from a supplier's Internet web page. In some instances, the customer then creates the configuration through the Web (in this instance, if the customer utilizes a Web based configurator) and then transfers the configuration to their ERP (enterprise resource planning) system, or through utilization of custom configuration tools, e.g., a CND (computer network designer), or similar configuration tool. In other instances, the customer may manually enter the configuration into a spreadsheet application. A partner of the customer stores the configuration information in their system. The stored configurations are quite volatile to change in component configuration on the supplier's side. If the partner submits the configuration as part of a component order, the configuration can be valid or invalid. If the configuration is valid, the order can be accepted. Alternatively, if invalid, the partner needs to correct the configuration and then resubmit the order. In many instances, this causes a reinitiating of the purchasing approval process on the partner side, thus adding substantial expense to the cost of the network. In this B2B scenario, the configuration is checked after ordering.

Accordingly, current network component configuration checking mechanisms and/or methods provide for checking of the configuration concurrent with or until after the ordering of the network components, thus causing increased costs associated with network development, implementation, upgrades, and the like. Thus, a need exists for a method that validates the configuration of network components prior to order submission.

SUMMARY OF THE INVENTION

A method and apparatus for product configuration validation is disclosed. In one embodiment, the present method is comprised of receiving a product configuration transmitted from a procuring computer system. The product configuration is received by a computer system. The computer system is configured to cause the distribution of a product utilized in the product configuration to the procuring computer system. The product configuration is compared with parameters relative to functionality of the product when in the product configuration. The functionality parameters are stored on the computer system. The comparing is for validating the product configuration.

Advantageously, the present method and apparatus provides for product configuration validation that may not only reduce the instances of products being improperly configured as well as realizing a reduction in costs associated with redesigning the configuration in which the product is implemented, and associated procurement costs.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
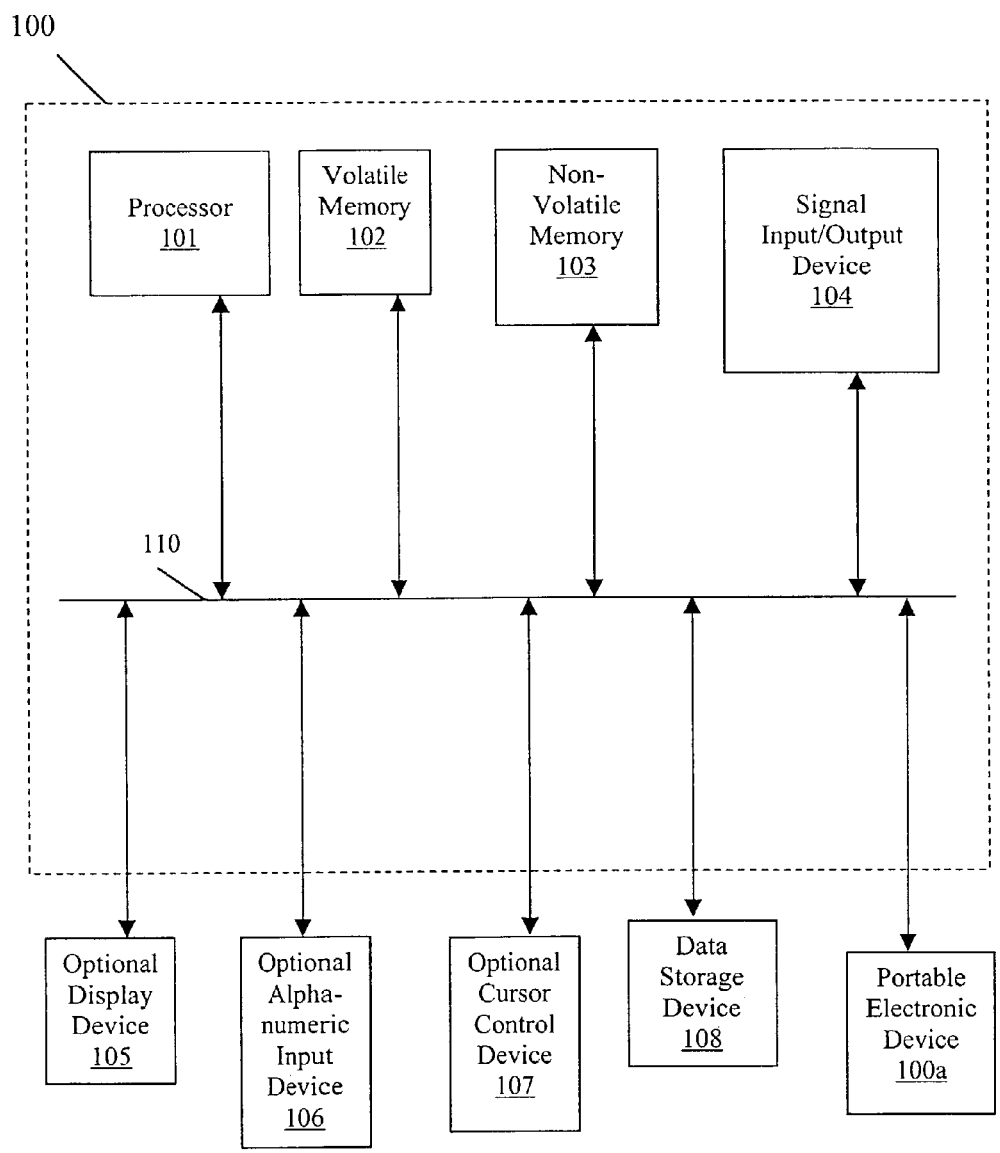
FIG. 1 is a block diagram of an exemplary computer system on which embodiments of the present invention can be practiced.

A method for product configuration validation prior to ordering is described. In the following description, for purposes of explanation, numerous specific details are set forth in order to provide a thorough understanding of the present invention. To one skilled in the art, the present invention may be practiced without these specific details. In other instances, well-known structures and devices are shown in block diagram form in order to avoid obscuring the present invention.

Some portions of the detailed descriptions, which follow, are presented in terms of procedures, steps, logic blocks, processes, and other symbolic representations of operations that are performed during product configuration validation. These descriptions and representations are the means used by those skilled in the network communication device and data communication arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

The present invention, a method and apparatus of product configuration validation prior to ordering is discussed primarily in the context of network components utilized in a network architecture and topology. However, embodiments of the present invention can be utilized in validating nearly any type of component configuration where the component's functionality can be affected by the configuration in which the component is implemented, including, but which is not limited to, networks having hardware components and software components which provide communication functionality to and/or access to some type of network. Examples of hardware components can include, but which is not limited to, hubs, switches, routers, modems, bridges, access points for wireless networks, patch panels, cabling, rack mounts, encasing structures, environment controlling devices (e.g., fans, coolers, etc.), security devices (e.g., firewalls), network interface cards (wireline or wireless), servers, power supplies, repeaters, and the like. Examples of software components can include, but is not limited to, I/O software, environment monitoring software, security software, communication protocol software, fault detection software, troubleshooting software, and the like, which provide communication functionality to and/or access to some type of network. Thus, nearly anything associated with a network architecture and/or topology should be considered a network component or product.

For purposes of the present application, the term "network component" or "network product" is not limited to hardware devices. Instead, the term "network component" or "network product" is also intended to include software code for enabling communication within a network. As such, for purposes of the present application, the terms "network component" and "network product" will be considered synonymous and will be used interchangeably throughout the present application.

For purposes of the present application, the term "electronic computer system" or "computer system" is intended to include computer systems that may or may not easily transportable, e.g., a laptop computer system, a desktop computer system, a workstation, a server, or other computer system. Furthermore, the "electronic computer system" is configured such that it has the ability to communicate with a network or other computers, either through a wireline connection e.g., a modem or a NIC (network interface card) and the like, or through a wireless connection.

With reference to FIG. 1, portions of the present invention are comprised of computer-readable and computer executable instructions which reside, for example, in computer-readable media of an electronic system such as a computer system. FIG. 1 illustrates an exemplary computer system 100 upon which embodiments of the present invention may be practiced.

FIG. 1 is a block diagram illustrating an exemplary computer system 100 that can be used in accordance with an embodiment of the present invention. It is noted that computer system 100 can be nearly any type of computing system or electronic computing device including, but not limited to, a server computer, a desktop computer, a laptop computer, or a portable electronic device. Within the context of the present invention, certain discussed processes, procedures, and steps are realized as a series of instructions (e.g., a software program) that reside within computer system memory units of computer system 100 and which are executed by a processor(s) of computer system 100, in one embodiment. When executed, the instructions cause computer system 100 to perform specific actions and exhibit specific behavior which is described in detail herein.

Computer system 100 of FIG. 1 comprises an address/data bus 110 for communicating information, one or more central processors 101 coupled to bus 110 for processing information and instructions. Central processor(s) 101 can be a microprocessor or any alternative type of processor. Computer system 100 also includes a computer usable volatile memory 102, e.g., random access memory (RAM), static RAM (SRAM), dynamic RAM (DRAM), synchronous dynamic RAM (SDRAM), double data rate RAM (DDR RAM), etc., coupled to bus 110 for storing information and instructions for processor(s) 101. Computer system 100 further includes a computer usable non-volatile memory 103, e.g., read only memory (ROM), programmable ROM, electronically programmable ROM (EPROM), electrically erasable ROM (EEPROM), flash memory (a type of EEPROM), etc., coupled to bus 110 for storing static information and instructions for processor(s) 101. In one embodiment, non-volatile memory 103 can be removable.

System 100 also includes one or more signal generating and receiving devices, e.g., signal input/output device(s) 104 coupled to bus 110 for enabling computer 100 to interface with other electronic devices. Communication interface 104 can include wired and/or wireless communication functionality. For example, in one embodiment, communication interface 104 is a serial communication port, but can alternatively be one of a number of well known communication standards and protocols, e.g., a parallel port, an Ethernet adapter, a FireWire (IEEE 1394) interface, a Universal Serial Bus (USB), a small computer system interface (SCSI), an infrared (IR) communication port, a Bluetooth wireless communication adapter, a broadband connection, a satellite link, an Internet feed, a cable modem, and the like. In another embodiment, a digital subscriber line (DSL) can be implemented as signal input/output device 104. In such an instance, communication interface 104 may include a DSL modem.

Computer 100 of FIG. 1 can also include one or more computer usable data storage device(s) 108 coupled to bus 110 for storing instructions and information, in one embodiment of the present invention. In one embodiment, data storage device 108 can be a magnetic storage device, e.g., a hard disk drive, a floppy disk drive, a zip drive, or other magnetic storage device. In another embodiment, data storage device 108 can be an optical storage device, e.g., a CD (compact disc), a DVD (digital versatile disc), or other alternative optical storage device. Alternatively, any combination of magnetic, optical, and alternative storage devices can be implemented, e.g., a RAID (random array of independent disks) configuration. It is noted that data storage device 108 can be located internal and/or external of system 100 and communicatively coupled with system 100 utilizing wired and/or wireless communication technology, thereby providing expanded storage and functionality to system 100. It is further noted that nearly any portable electronic device, e.g., device 100a, can also be communicatively coupled with system 100 via utilization of wired and/or wireless technology, thereby expanding the functionality of system 100.

System 100 can also include an optional display device 105 coupled to bus 110 for displaying video, graphics, and/or alphanumeric characters. It is noted that display device 105 can be a CRT (cathode ray tube), a thin CRT (TCRT), a liquid crystal display (LCD), a plasma display, a field emission display (FED) or any other display device suitable for displaying video, graphics, and alphanumeric characters recognizable to a user.

Computer system 100 of FIG. 1 further includes an optional alphanumeric input device 106 coupled to bus 110 for communicating information and command selections to processor(s) 101, in one embodiment. Alphanumeric input device 106 is coupled to bus 110 and includes alphanumeric and function keys. Also included in computer 100 is an optional cursor control device 107 coupled to bus 110 for communicating user input information and command selections to processor(s) 101. Cursor control device 107 can be implemented using a number of well known devices such as a mouse, a trackball, a track pad, a joy stick, a optical tracking device, a touch screen, etc. It is noted that a cursor can be directed and/or activated via input from alphanumeric input device 106 using special keys and key sequence commands. It is further noted that directing and/or activating the cursor can be accomplished by alternative means, e.g., voice activated commands, provided computer system 100 is configured with such functionality.

Figure 2A:
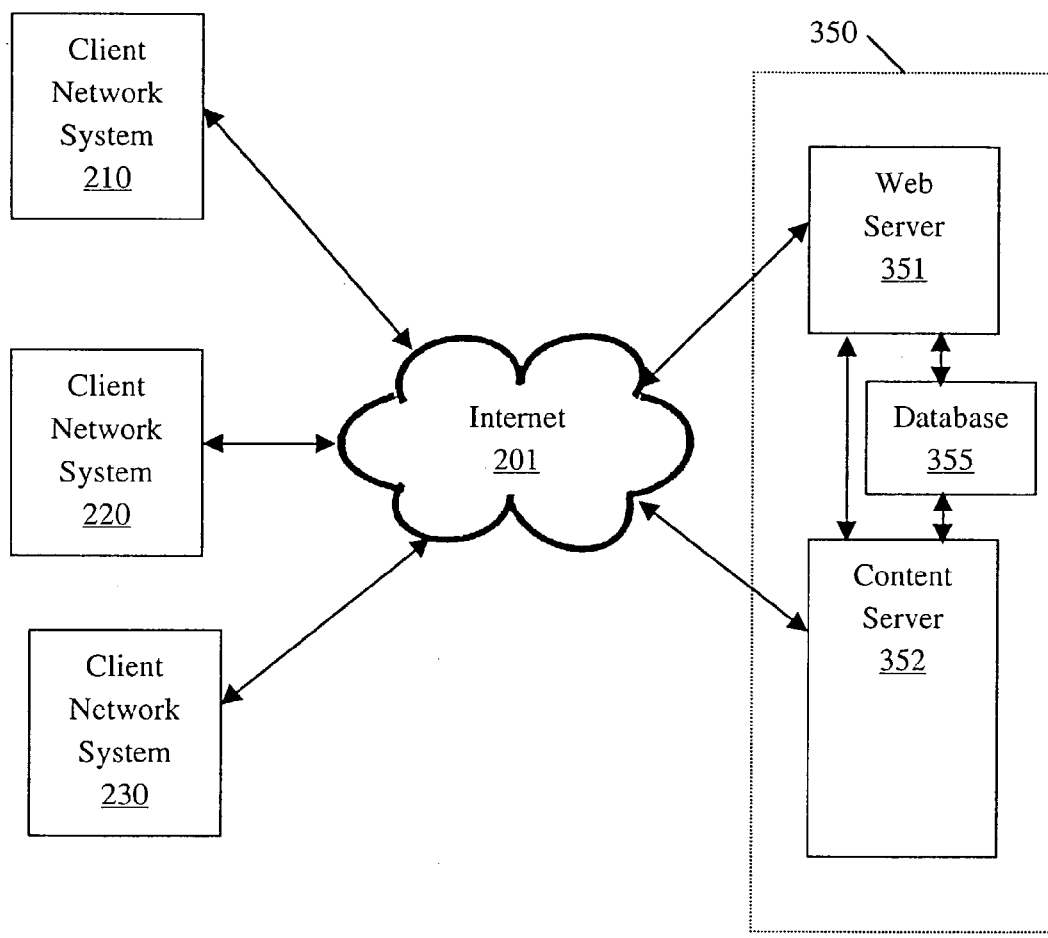
FIG. 2A is a block diagram of an exemplary client/host network in accordance with one embodiment of the present invention.

FIG. 2A is a block diagram of an exemplary network 200 in which embodiments of the present invention may be implemented. In one example, network 200 enables one or more client network systems (e.g., 210, 220, and 230), each of which are coupled to Internet 201, to communicate with a host system 350, via the Internet 201. In the present example, client network systems 210, 220, and 230 can be comprised of tens, hundreds, or thousands of computer systems 100 communicatively coupled. Each client network system 210, 220, and 230 can also be comprised of a nearly endless variety of network components. Host system 350 is shown to have a web server 351 and/or a content server 352 and/or a database 355 disposed therein.

Network 200 includes a web server 351 and a content server 352, within host 350, which are communicatively coupled to Internet 201. Further, web server 351 and content server 352 can be communicatively coupled without utilizing Internet 201, as shown. Additionally, web server 351 and content server 352 can be communicatively coupled with database 355, enabling access to information and data stored therein. Host system 350, web server 351, content server 352, and client network systems 210, 220, and 230 can communicate with each other. It is noted that computers and servers of network 200 are well suited to be communicatively coupled in various implementations. For example, web server 351, content server 352, and client network systems 210, 220, and 230 of network 200 can be communicatively coupled via wired communication technology, e.g., twisted pair cabling, fiber optics, coaxial cable, etc., or wireless communication technology, or a combination of wired and wireless communication technology. Further, web server 351, content server 352, and database 355 can be communicatively coupled utilizing wireline, wireless, or a combination of wireline and wireless communication technologies.

Still referring to FIG. 2A, it is noted that host system 350, web server 351, content server 352, and client network systems 210, 220 and 230 of network 200 can, in one embodiment, be each implemented in a manner similar to computer system 100 of FIG. 1. However, the server and client systems in network 200 are not limited to such implementation. Additionally, web server 351 and content server 352 can perform various functionalities within network 200. It is noted that, in one embodiment, client network systems 210, 220, and 230, and web server 351, content server 352, and database 355 can be disposed on a single or a plurality of physical computer systems, e.g., computer system 100 of FIG. 1.

Figure 2B:
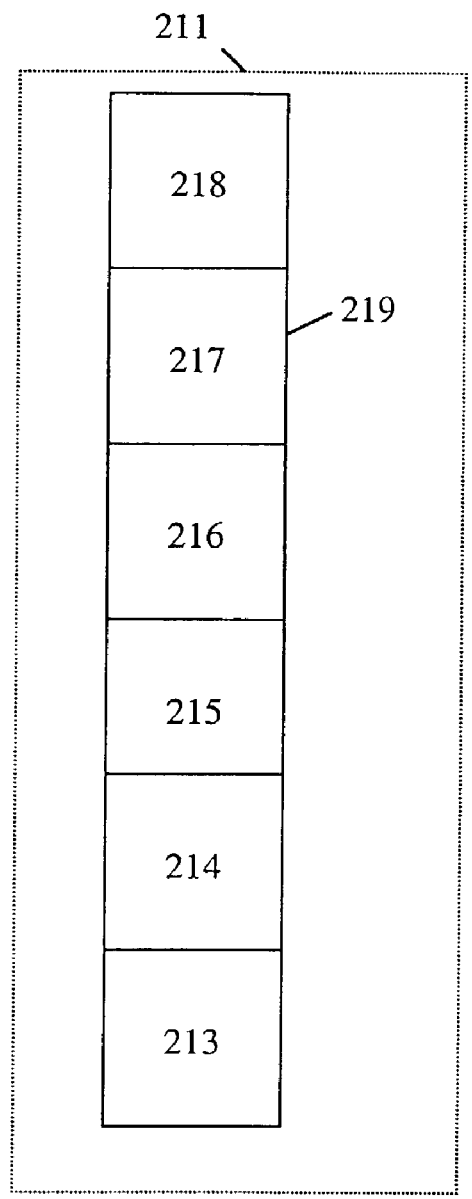
FIG. 2B is a block diagram of an exemplary client network system upon which embodiments of the present invention may be practiced.

FIG. 2B is a block diagram of an exemplary network 211 including various exemplary architectural and topological sections, e.g., sections 213, 214, 215, 216, 217, and 218, each of which are described in FIGS. 2H, 2G, 2F, 2E, 2D, and 2C, respectively, that may be implemented as part of a client network system, e.g., client network 210 of FIG. 2A. Communication link 219 enables communication between sections 213-218, communication of network components within each of sections 213-218, as well as enabling sections 213-218 to access and communicate with an Internet, e.g., Internet 201 of FIG. 2A. Communication link 219 can be implemented utilizing any communication technology, e.g., wireline, wireless, or a combination thereof. Exemplary sections 213-218 may each be implemented in their entirety, in portions of, in multiples thereof, in combinations with other portions, integrated with other portions, in multiple integrated combinations, and so on. The network component information related to portions 213-218 and to the entire network 211 can be stored in a network data storage as a network configuration, e.g., in data storage 249 as network configuration 248 as described in FIG. 3.

Because there are currently hundreds, if not thousands, of differing network architectures and topologies that can be implemented in a network system, e.g., client network system 210 of FIG. 2A, the instant disclosure will describe commonly implemented architecture types and associated topologies. The size of the network and the functions that the network will enable are key factors in the design of the network and the types of architectures and topologies implemented. Accordingly, network 211 is for illustrative purposes and, as such, should not be construed as limiting with regard to aspects of a network, e.g., topology, component implementation, configuration, size, shape, connections, functions, and so on.

In many instances, networks are depicted and described in a hierarchical manner, e.g., commencing with sections having greater functionality and/or larger numbers of components, and ending with sections having lesser functionality and/or fewer numbers of components. Accordingly, sections 213-218 will be described in such a hierarchical manner, such that section 218 provides greater functionality and/or has larger numbers of components and section 213 provides less functionality and/or has fewer components disposed therein.

Continuing, it is common for many types of network components to be configurable to provide varying degrees of functionality and performance, dependent upon its implementation. For example, a router in one implementation may perform functions different than an analogous router in a different implementation. Accordingly, it is important to store information regarding the network components implemented within a network, but it is also as important to store information regarding the manner in which the network component is implemented.

Figure 2C:
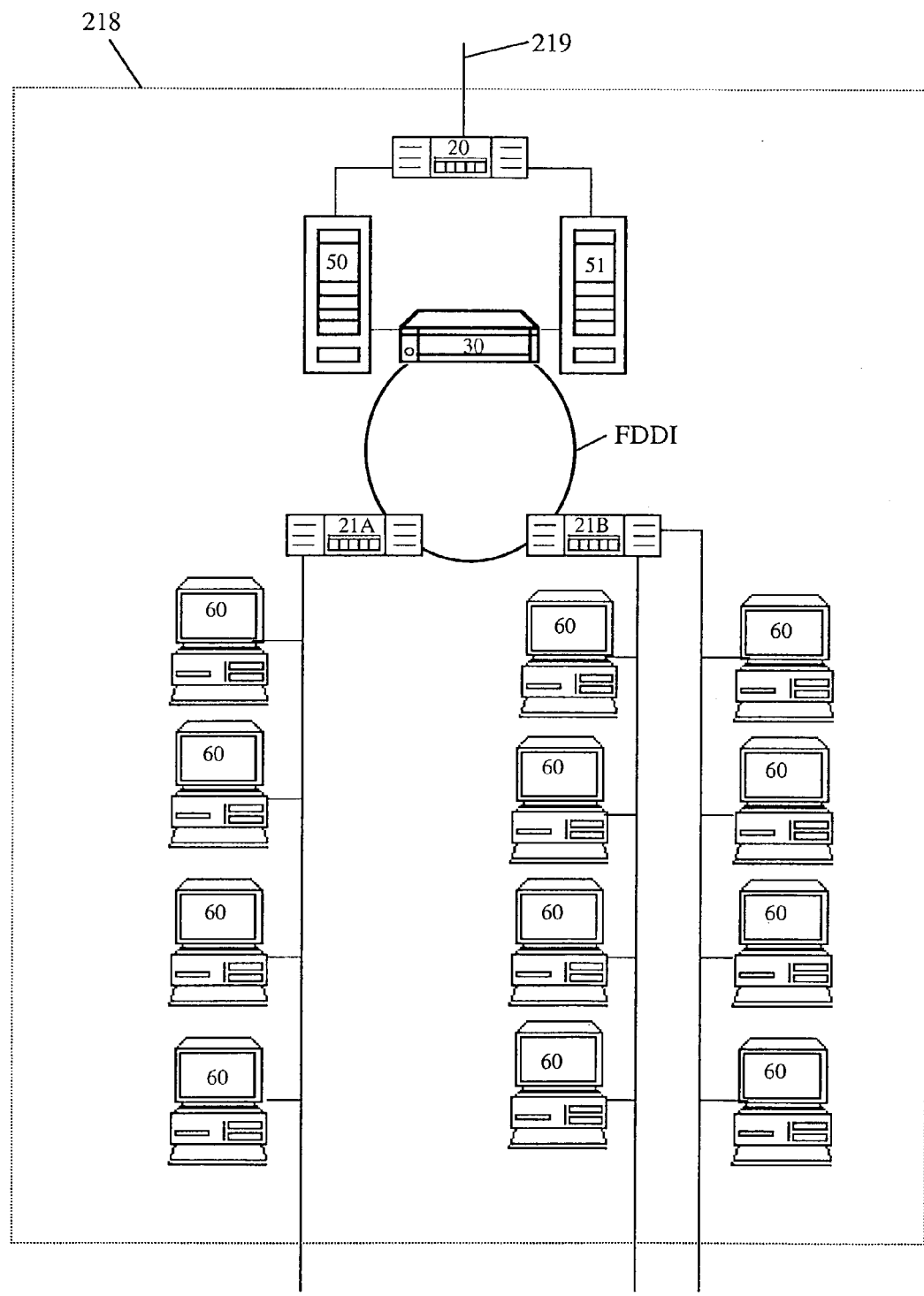
FIG. 2C is a diagram of an exemplary network architecture and topology that may be implemented in a client network system.

FIG. 2C represents section 218 of network 211 (FIG. 2B) in an exemplary implementation as an Enterprise network (a large LAN (local area network)) architecture with an FDDI (fiber distributed data interface) backbone utilizing a token ring topology. Section 218 is shown to include a router 20 coupled to communication link 219. In one implementation, router 20 may be configured to utilize router tables. Connected to router 20 are two servers, servers 50 and 51. A concentrator 30 is coupled to servers 50 and 51. Concentrator 30 is coupled to a pair of analogous routers, 21A and 21B. An FDDI is utilized to couple routers 21A and 21B with concentrator 30. Routers 21A and 21B are coupled with numerous computer stations 60. It is noted that each computer station 60 may represent one computer station, although it is common in network diagrams for component icons to represent more that one instance of the component. In the present example, section 218 can be coupled to one or more sections, e.g., sections 213-217.

Figure 2D:
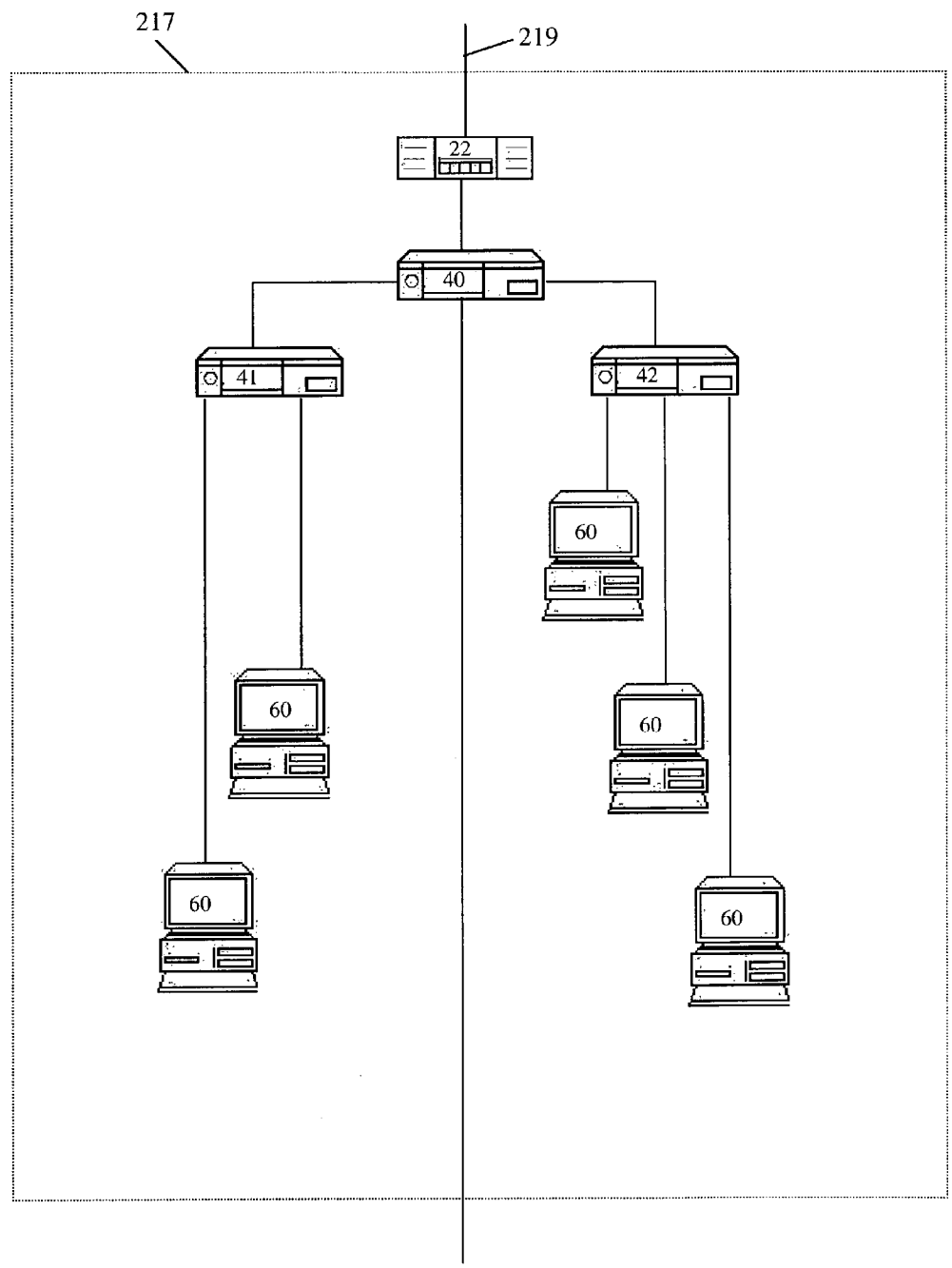
FIG. 2D is a diagram of an alternative exemplary network architecture and topology that may be implemented in a client network system.

FIG. 2D represents section 217 of network 211 (FIG. 2B) in an exemplary implementation as a LAN emulation with edge switches with an Ethernet topology. Section 217 is shown to include communicative link 219 which is coupled to router 22. Router 22 is coupled with a backbone switch 40. Backbone switch 40 is coupled with edge switch 41 and edge switch 42. In one example, edge switch 41 is able to handle less traffic than edge switch 42. Coupled with edge switch 41 are multiple computer stations 60. Coupled with edge switch 42 are a greater number of computer stations 60 that are coupled with edge switch 41.

Figure 2E:
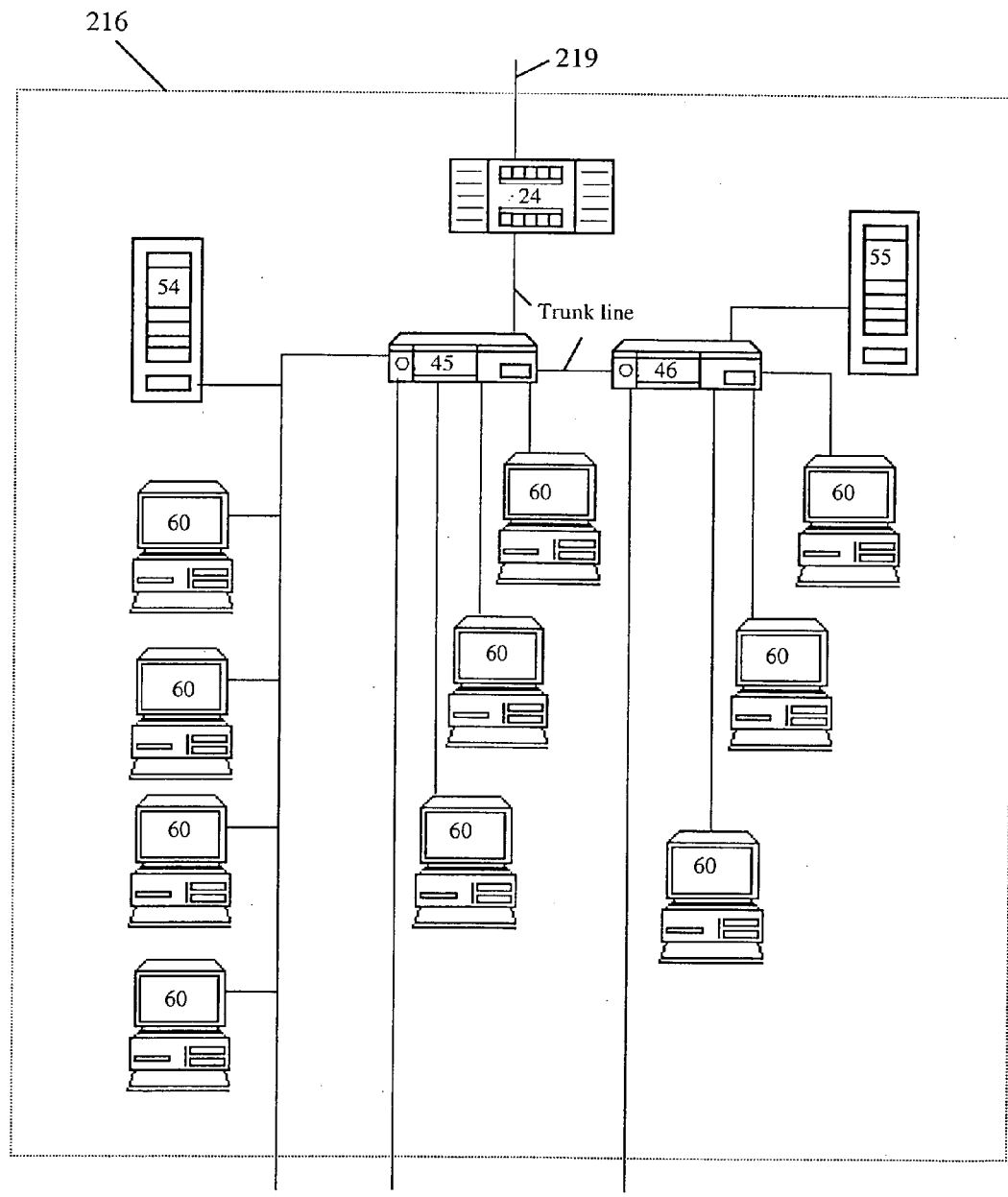
FIG. 2E is a diagram of another alternative exemplary network architecture and topology that may be implemented in a client network system.

FIG. 2E represents section 216 of network 211 (FIG. 2B) in an exemplary implementation as a router routing between virtual LANs via trunk lines network architecture utilizing a switched Ethernet topology. Section 216 is shown to include communicative link 219 which is coupled to router 24. In an exemplary implementation, router 24 may be an ATM (asynchronous transfer mode) router. Router 24 is coupled to a switch 45 via a trunk line. Switch 45 is coupled to a switch 46 via a trunk line. A server 54 is shown coupled to switch 45 and a server 55 is shown coupled to switch 46. In the architecture depicted, each computer station 60 may have access to either server by utilization of the functionality provided by switches 45 and 46.

Figure 2F:
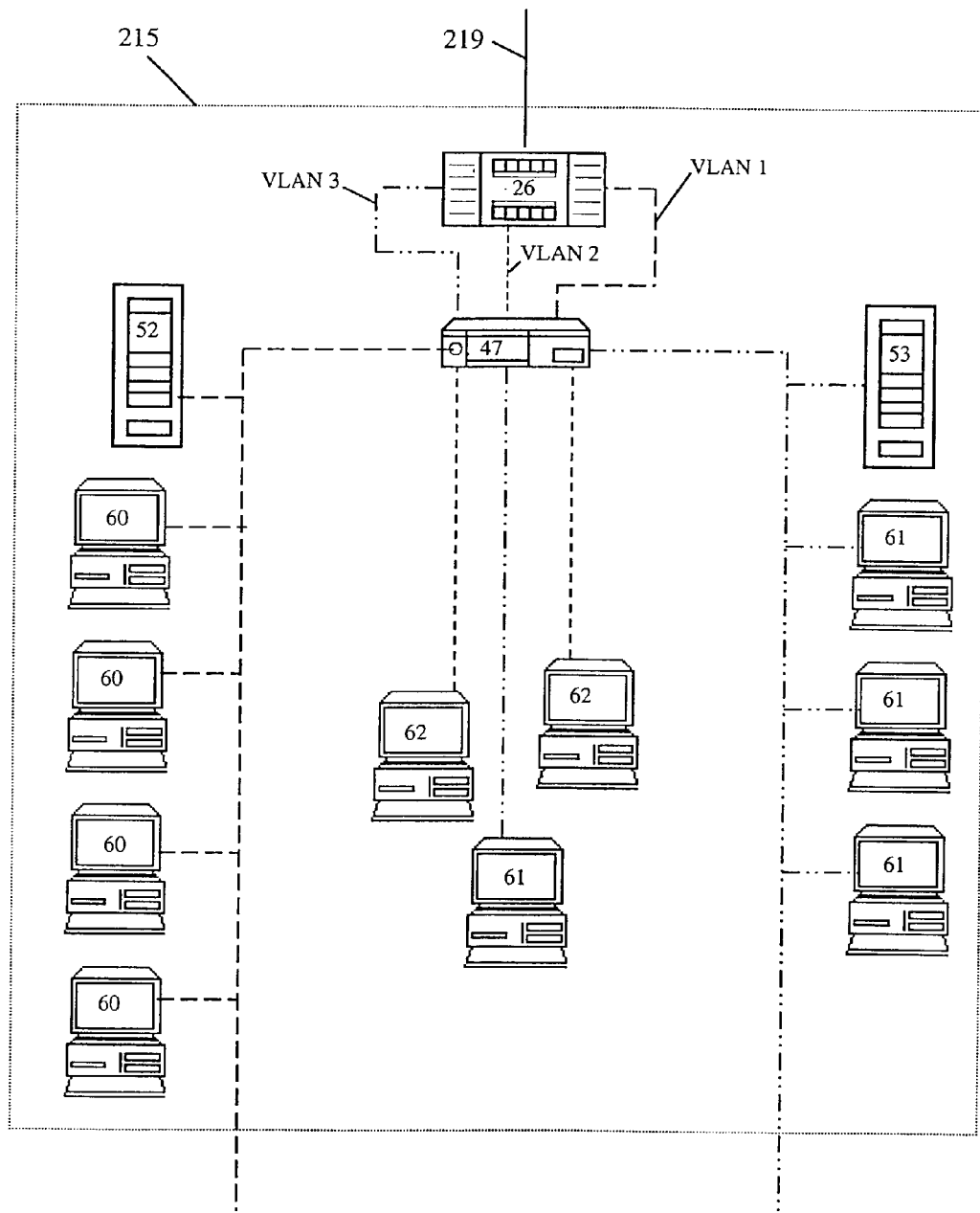
FIG. 2F is a diagram of yet another alternative exemplary network architecture and topology that may be implemented in a client network system.

FIG. 2F represents section 215 of network 211 (FIG. 2B) in an exemplary implementation of a router routing between virtual LANs (VLAN) architecture with Ethernet topology. Section 215 includes a communication link 219 coupled to a router 26. Router 26 is coupled to a switch 47 via a VLAN 1, VLAN 2 and a VLAN 3. A Server 53 is coupled to router 26 via switch 47 and VLAN 3. A server 52 is coupled to router 26 via switch 47 and VLAN 1. Multiple computer stations 60 are coupled with server 52 via VLAN 1. Multiple computer stations 61 are coupled to server 53 via VLAN 3. Computer stations 62 are coupled to switch 47 via VLAN 2. It the depicted architecture, computer stations 60, 61, and 62, are enabled to communicate with either server 52 and/or server 53 via switch 47 and VLANs 1, 2, and/or 3.

Figure 2G:
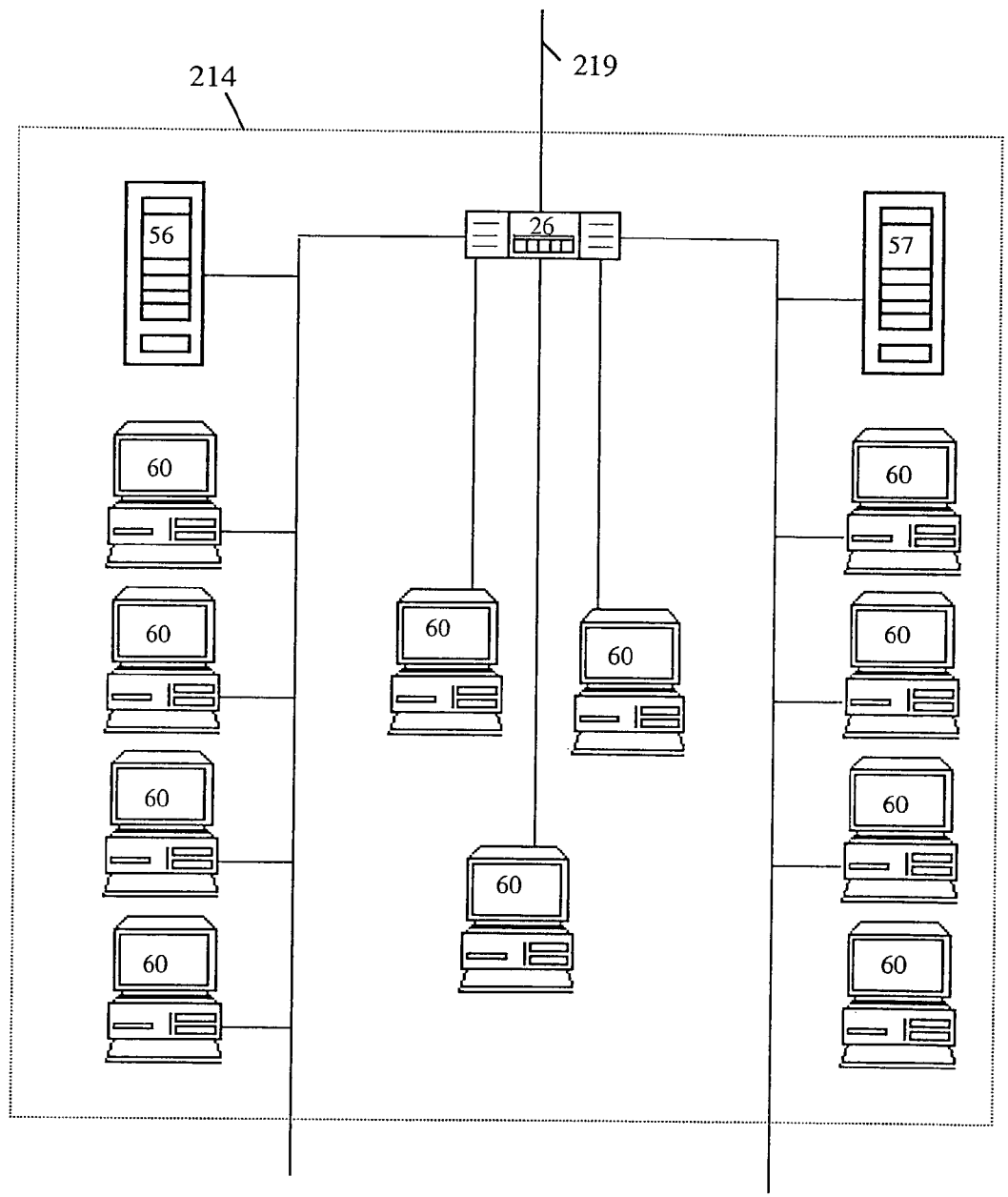
FIG. 2G is a diagram of still another alternative exemplary network architecture and topology that may be implemented in a client network system.

FIG. 2G represents section 214 of network 211 (FIG. 2B) in an exemplary implementation of a collapsed backbone architecture with Ethernet topology. Section 214 is shown to include a communication link 219 coupled to a router 26. Router 26 is coupled with a server 56 and a server 57. Multiple computer stations 60 are coupled with servers 56 and 57.

Figure 2H:
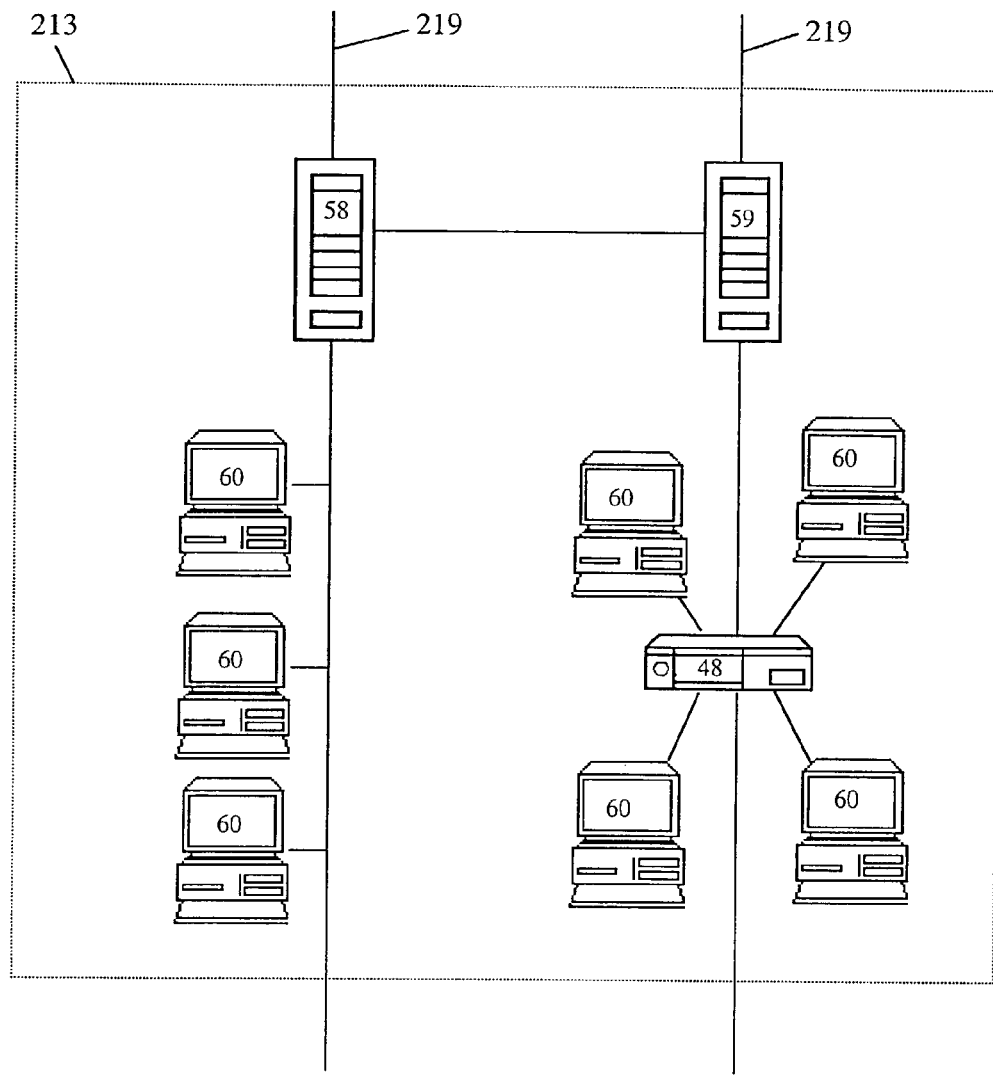
FIG. 2H is a diagram of an additional alternative exemplary network architecture and topology that may be implemented in a client network system.

FIG. 2H represents section 213 of network 211 (FIG. 2B) in an exemplary implementation of an Ethernet and a star topology. A server 58 is coupled to a communication link 219 and to multiple computer stations 60 in an Ethernet topology. A server 59 is coupled to a communication link 219 and to a switch 48. Multiple computer stations 60 are coupled with server 59 via switch 48.

Referring collectively to sections 213-218 of FIGS. 2B-2H, and shown hierarchically, changes to one or more network components in a section hierarchically above other sections, e.g., section 218, could have a detrimental effect to components in those sections hierarchically lower than 218, e.g., sections 213-217. For example, a change in or upgrade to router 20 (section 218 of FIG. 2C) could detrimentally affect other routers hierarchically lower, e.g., router 24 of section 216 of FIG. 2E, and/or other network components which, in turn, could reverberate through out each lower section.

In another example, the I/O software that supports switch 40 (section 217 of FIG. 2D) is upgraded. It is common for upgrades in I/O software to cease support for legacy network components. Thus, an upgrade in I/O software for switch 40 may render other switches or other network components disposed hierarchically lower inoperable.

In yet another example, additional computer stations 60 are to be added to server 52 (FIG. 2F). However, if server 52 does not have the capability to handle more traffic, adding more stations could detrimentally affect server 52 as well as those sections hierarchically lower, e.g., 214 and 213.

Therefore it is important to accessibly store information associated with each network component implemented in a network, e.g., 211. Further, it is important to accessibly store the information associated with the manner in which the network components are implemented within a variety of network architectures and/or topologies, as shown in FIGS. 2C-2H. The combined information constitutes network configuration information. By virtue of embodiments of the present invention, as described herein, which provide for accessing stored network configuration information, and checking of network components in network configurations, e.g., in sections 213-218 of network 211 and/or as described herein with reference to FIG. 3, a reduction in invalid configurations can be realized.

Figure 3:
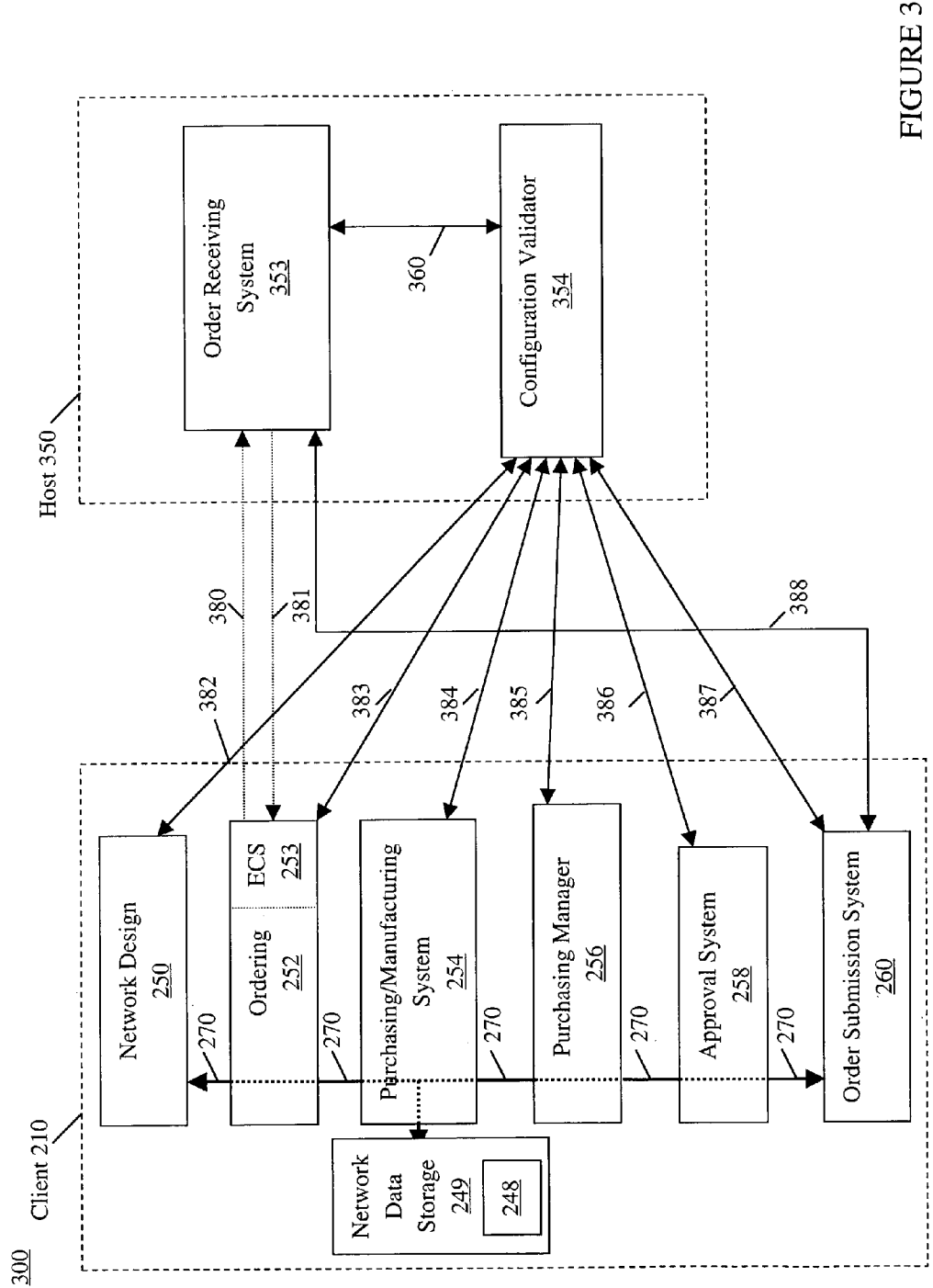
FIG. 3 is a block diagram of an exemplary network product configuration validation environment in accordance with one embodiment of the present invention.

FIG. 3 is a block diagram of an exemplary environment 300 for validating product configuration prior to ordering, in one embodiment of the present invention. Client 210 can communicatively couple to a network 200 to acquire products, e.g., network components, from a seller of network products, e.g., host 350. In environment 300, client 210 is communicatively coupled to host 350 via the Internet, e.g., Internet 201 of FIG. 2.

Client 210 is shown to include a network design section 250. Network design 250 represents network personnel/software which may design and engineer a network, e.g., network 248 in network data storage 249, which can include, but is not limited to, selecting the network products necessary to facilitate the desired network.

Client 210 also includes an ordering section 252 for initial ordering of products from a seller, e.g., host 350. It is noted that ordering 252 can be communicatively coupled with any division or department within client 210. Ordering 252 is shown to include an ECS (electronic commerce solution) 253 for performing processes associated with ordering of products, e.g., analysis, sourcing, and procuring. Examples of ECS's can include, but is not limited to, Conductor by Commerce One, EProcurer™ by Clarus, Procurement™ by Ketera, Buyer by Ariba, and many others. In one instance, Buyer by Ariba can be implemented as an ECS 253.

Still referring to FIG. 3, also shown within client 210 is a purchasing/manufacturing system section 254, a network data storage section 249 for storing the information related to the network and the products therein, a purchasing manager section 256 who oversees the purchasing of products, e.g., network products, an approval system section 268 for approving, but not limited to, purchases of network products, and an order submission system section 260 for ordering the desired network products from host 350.

It is noted that sections 250, 252, 254, 256, 258, and 260, of client 210 are communicatively coupled with each other via communication line 270. Communication line 270 can be implemented utilizing nearly any wireline or wireless communication technology. Line 270 enables each section to communication with any other section. For example, section 260 can communicate with section 252 without having to communicate with sections 254, 256, and 258. In another example, section 252 can communicate with section 256 without having to communicate with section 254, and so on. Additionally, each section (e.g., 250, 252, 254, 256, 258, and 260) can access data associated with each network stored in network data storage 249, e.g., network 248.

It is particularly noted that the departments shown, and the manner in which a request for a network is implemented in client 210 described herein, are for illustrative purposes and should not be considered as limiting with respect to the number or types of department s within in a client system 210. Nor should the manner in which the request to acquire components of networks or entire networks is forwarded to the various departments within client 210 be construed as limiting, but rather for illustrative purposes.

Also shown in FIG. 3 is a host computer system, e.g., host 350, with whom a client computer system, e.g., client 210, 220, and/or 230, can communicatively couple, via Internet 201, to order products, e.g., network components, therefrom. Host system 350 is shown to include a order receiving system 353 configured for receiving orders.

Host system 350 also includes a configuration validator 354 for validating network component configurations. System 353 and validator 354 are communicatively coupled via communication line 360. Line 360 can implemented utilizing nearly any wireline or wireless technology. In one embodiment, system 353 can be wholly disposed in web server 351 or content server 352 of FIG. 2. In another embodiment, system 353 can have portions disposed in server 351 and other portions disposed in content server 352 of FIG. 2. Additionally, configuration validator 354 can, in one embodiment, be wholly disposed in web server 351 or content server 352 of FIG. 2.

Order receiving system 353 can be nearly any automated receiving system, e.g., an inventory management system, order fulfilling system, order processing system, etc.

Still referring to FIG. 3, configuration validator 354 is, in one embodiment, adapted to validate a received client's network component configuration (such as network 248 stored in network data storage 249) by comparing it with known proper network configurations relative to the components and design of the client's network configuration. In one embodiment, host system 350 can store data associated with their network components in a nearly endless variety of theoretical and/or actual valid network configurations in a database, e.g., database 355 of FIG. 2. Further, in one embodiment, the data can be stored in a hierarchical manner, in reference to a network topology or in reference to a particular disposition of a component, meaning that those components having higher levels of functionality are referenced above those components having lower levels of functionality. Additionally, the data, in one embodiment, can be stored in an XML (extensible markup language) format, although alternative languages having similar properties may implemented. Configuration validator 354 is configured to access database 355 (FIG. 2A) to facilitate the validation. Utilizing the received client network configuration, e.g., a configuration of network 248 stored in network data storage 249 of client 210, and comparing that with known proper network configuration associated with the components and design of the client's network 248, configuration validator 354 will cause host system 350 to transmit to a client, e.g., client 210, a valid configuration indicator when the client's network configuration is a legitimate network configuration, given the design and components associated therewith. Conversely, if client's 210 network configuration 248 is an improper configuration, configuration validator 354 will cause host 350 to transmit to the client an invalid network configuration indicator.

Further, if configuration validator 354 determines that client's 210 network configuration 248 is invalid, configuration validator 354 can evaluate which components or portions of the network 248 cause the invalid configuration. Continuing, configuration validator 354 can provide suggestions and/or recommendations for replacing the invalid portions with alternative designs and/or components to provide a possible valid network configuration 248 to the client system, e.g., client 210, 220, and/or 230. Additionally, configuration validator 354 can then cause host system 350 to transmit to client 210 the alternative network configuration, thereby obviating the need of client 210 to perform the process of redesign and resubmission of the network configuration. Advantageously, a substantial reduction in client side costs associated with network implementation can be realized by client 210.

Additionally, it is well known in the art that it is common for periods of time to pass, e.g., hours, days, weeks, months, and in some instances years, from the time that a network 248, e.g., client network system 211 of FIG. 2B, is developed by a network design 250 to the time when an order submission system 260 actually submits the order for a network 248, in its entirety or components thereof.

For example, network design 250 develops a network 248, stores the information in network data storage 249, and sends a request for evaluation and acquisition of designed network 248 to the necessary departments. Purchasing system 254 may not evaluate the request for a few days. The request is then forwarded to purchasing manager 256, which may not review the design for a couple of weeks. Once purchasing manager 256 authorizes acquisition of network 248, the request is forwarded to approval system 258. Approval system 258, in one instance, may be under budgetary constraints, and is unable to approve the designed network 248 for a period of three months. Once approval system 258 finally gives the approval to acquire the component in network 248, then order submission system 260 submits the order for the entire network 248 or portions thereof. In this example, it has taken approximately three months from the time of design of network 248 to the time when order submission system 260 actually submits an order, via line 389 for network 248. Disadvantageously, it is well known that many changes can occur to components in a network design, e.g., network 248, during a three month period.

Advantageously, embodiments of the present invention also provide for a way for each department in client 210, e.g., 250, 252, 254, 256, 258, and 260, to initiate configuration validator 354 to perform a validation of the configuration of network 248, stored as network 248 in network data storage 249, at any time during the acquisition process, shown facilitated by communication lines 382, 383, 384, 385, 386, and 387 respectively. It is noted that, in one embodiment, Internet 201 is utilized by communication lines 382-387. Thus, network design 250 can initiate configuration validator 354 to validate the configuration of network 248 via line 382, purchasing manager 256 can initiate configuration validator 354 to validate the configuration of network 248 via communication line 385, and so on.

Referring still to FIG. 3, in one scenario, network design 250 of client 210, e.g., client's 210 design engineers, has designed a network 248 for client 210. In another scenario, network design 250 has determined that some components of their existing network 248 need to be upgraded. Alternatively, client 210, in another scenario, may have received notice from host 350 that a component or components (hardware and/or software) in network 248 is/are to be upgraded or replaced. Upgrading and/or replacing network components can be for a nearly endless variety of reasons, including, but not limited to, discontinued support for a component, an improvement in an existing component, replacing one component with another component having improved characteristics and performance, implementation of a newly developed component, replacement for a problematic component, bug fixes, security enhancements, and the like.

Advantageously, by host 350 configured with a configuration validator 354 to validate network configurations, e.g., the configuration of network 248, invalid network designs and configurations can be detected prior to initiating the acquisition process invoked by a client 210. Additionally, by availing the functionality of configuration validator 354 to the departments within client 210 such that the configuration of network 248 can be validated by any of those departments during the acquisition process, a substantial reduction in costs associated with network redesign and re-initiation of the acquisition process can be realized by client 210.

Figure 4:
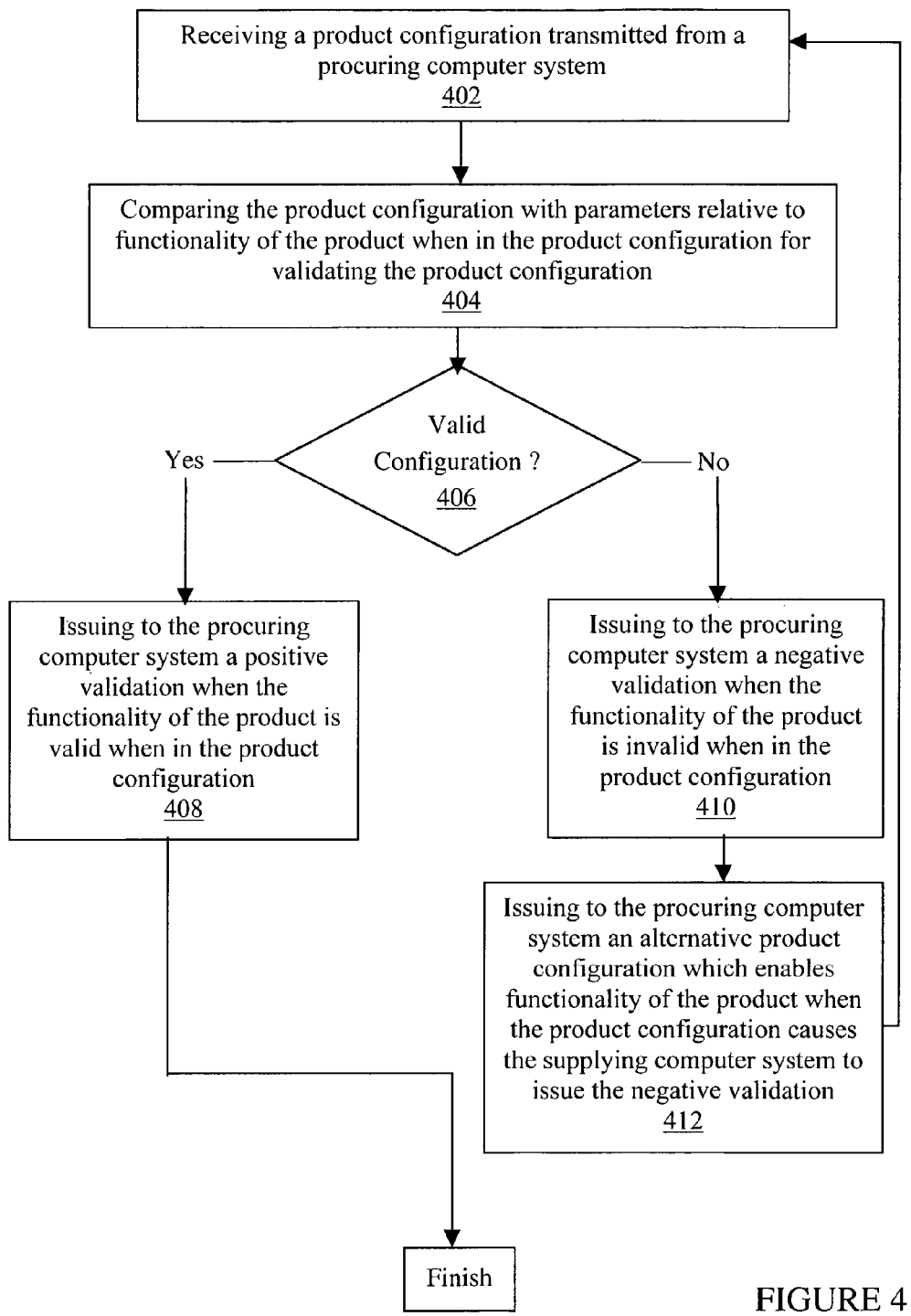
FIG. 4 is flowchart of a process of product configuration validation prior to ordering in accordance with one embodiment of the present invention.

FIG. 4 is a flowchart 400 of steps performed in accordance with one embodiment of the present invention for validating a network configuration prior to ordering. Flowchart 400 includes processes of the present invention which, in one embodiment, are carried out by processors and electrical components under the control of computer readable and computer executable instructions. The computer readable and computer executable instructions reside, for example, in data storage features such as computer usable volatile memory 102 and/or computer usable non-volatile memory 103 of FIG. 1. However, the computer readable and computer executable instructions may reside in any type of computer readable medium. Although specific steps are disclosed in flowchart 400, such steps are exemplary. That is, the present invention is well suited to performing various other steps or variations of the steps recited in FIG. 4. Within the present embodiment, it should be appreciated that the steps of flowchart 400 may be performed by software, by hardware or by any combination of software and hardware.

In step 402 of FIG. 4, host system 350 receives a network or product configuration, e.g. a configuration of network 248 of FIG. 3, transmitted from client 210. In one embodiment, client 210 can store the configuration information in network data storage 249. As described herein, the network or component configuration 248 can be transmitted to host 350 from any department within client 210 that is so allowed.

In step 404, host system 350 activates a configuration validator 354 to compare the network/product configuration when the configuration of network 248 is received. Configuration validator 354 compares information related to a component in the received configuration of network 248 with information regarding the component and theoretical and/or actual network configurations in which the component can be implemented. In one embodiment, the data is stored in XML language. In one embodiment, the information regarding the component is stored hierarchically relative to the topology in which the component is implemented. Subsequent to configuration validator 354 comparing the information, the present method proceeds to step 406.

In step 406, if configuration validator 354 determines that the network/product configuration 248 is valid, such that the functionality of the component is retained while implemented in the configuration of network 248, the present method proceeds to step 408. Alternatively, if configuration validator 354 determines that the network/product configuration 248 is invalid, such that the functionality of the component is not retained while implemented in network configuration 248, the present method proceeds to step 410.

In step 408, in response to configuration validator 354 determining that the configuration of network 248 is valid, host system 350 transmits to client system 210 a signal indicating a positive validation has been determined for configuration 248. The signal can be, but is not limited to being, a bit in bit stream, an electronic mail (e-mail), an auto-generated electronic signal, or alternative manner to convey the positive validation. In one embodiment, the positive validation may be sent to the department or departments within client 210 (250, 252, 254, 256, 258, and/or 260) which requested the validation of the configuration of network 248. Alternatively, the positive validation may be sent to multiple departments within client 210, e.g., 250, 256, and 258.

In step 410 of FIG. 4, in response to configuration validator 354 determining that the configuration 248 is invalid, host system 350 transmits to client system 210 a signal indicating a negative validation has been determined for configuration of network 248. The signal can be, but is not limited to being, a bit in bit stream, an electronic mail (e-mail), an auto-generated electronic signal, or nearly any alternative manner which can convey the negative validation to client 210. In one embodiment, the negative validation may be sent to the department within client 210 (250, 252, 254, 256, 258, or 260) which requested the validation of the configuration of network 248. Alternatively, the negative validation may be sent to multiple departments within client 210, e.g., 250, 256, and 258.

In step 412, subsequent to host 350 transmitting a negative validation to client 210 for the configuration of network 248, host 350, may, optionally, cause configuration validator 354 to determine an alternative solution for configuration 248. In one embodiment, validator 354 can isolate the invalid portion of configuration 248 and suggest a replacement component or components that could be implemented to correct the invalid configuration and which would then create a configuration 248 that could receive a positive validation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system, comprising:
   a host computer configured to receive a network component configuration and to determine if the network component configuration is valid or invalid based on a comparison of the network component configuration to a first grouping of network component configurations that are supported at a time that the network component configuration is received, wherein the network component configuration is valid if the network component configuration matches the first grouping of network component configurations or invalid if the network component configuration does not match the first grouping of network component configurations;
   the host computer configured to cause data representing the network component configuration to be stored for subsequent analysis if said comparison identifies said match, wherein the stored data is formatted for submission as an order for the network component configuration;
   the host computer configured to access the stored data at various times after said storing, wherein the various times occur in a time range after said storing and before receiving, at the host computer, any order activity marked by newly received transmissions for the network component configuration, and determine, at each various time, whether the network component configuration represented by the stored data is valid or invalid based on second different groupings of the network component configurations that are supported at the respective various times; and
   the host computer configured to output a notification if an invalid result is obtained at one of the various times to prevent submission of an invalid order.

2. The system of claim 1, wherein if the network component configuration is invalid at one of the various times, the host computer causes new data representing a valid network component configuration to replace the stored data such that an order submission will utilize the new data, wherein the new data is formatted for submission as an order for the valid network component configuration.

3. An apparatus comprising:
   a processing device configured to:
   receive at a host computer a network component configuration generated by selecting from product offerings in association with an instance of order activity;
   determine if the network component configuration is valid or invalid based on a comparison of the network component configuration to a first grouping of network component configurations that are supported at a time that the network component configuration is received, wherein the network component configuration is valid if the network component configuration matches the first grouping of the network component configurations or invalid if the network component configuration does not match the first grouping of the network component configurations;
   cause an electronic file representing the network component configuration to be stored for subsequent analysis if said comparison identifies said match, the stored electronic file formatted for submission as an order for the network component configuration;
   access the stored electronic file at various times, wherein the various times occur in a time range after said storing and before receiving, at the host computer, any order activity marked by newly received transmissions, and determine, at each various time, whether the network component configuration represented by the stored electronic file is valid or invalid based on second different groupings of the network component configurations that are supported at the respective various times; and
   output a notification if an invalid result is obtained at one of the various times to prevent submission of an invalid order.

4. The apparatus of claim 3, wherein the first grouping is identified by accessing an extensible markup language (XML) file.

5. The apparatus of claim 3, wherein the stored electronic file is accessed by communicating with a remotely located procuring computer.

6. The apparatus of claim 3, wherein the processing device is further configured to cause a new electronic file representing an alternative network component configuration to be stored in place of the previous electronic file if an invalid result is obtained at one of the various times.

7. The apparatus of claim 3, wherein the processing device is further configured to initiate uploading of the stored electronic file from a remote storage at the various times.

8. The apparatus of claim 3, wherein the network component configuration identifies software and hardware components of a router, switch, or gateway.

9. A tangible computer readable medium encoded with instructions that, if executed by a processing device, result in:
   receiving a network component configuration;
   determining if the received network component configuration is valid or invalid based on a comparison of the network component configuration to a first grouping of network component configurations that are supported at a time of ordering activity, wherein the network component configuration is valid if the component configuration corresponds to the first grouping of the network component configurations or invalid if the network component configuration does not correspond to the first grouping of the network component configurations;
   causing an electronic file representing the network component configuration to be stored for subsequent analysis if said comparison identifies said match, the stored electronic file formatted for submission as an order for the network component configuration;
   accessing the stored electronic file at various times, wherein the various times occur in a time range after said storing and before receiving, at the host computer, any order activity marked by newly received transmissions, and determining, at each various time, whether the network component configuration represented by the stored electronic file is valid or invalid based on second different groupings of the network component configurations that are supported at the respective various times; and
   outputting a notification if an invalid result is obtained at one of the various times to prevent submission of an invalid order.

10. The computer readable medium of claim 9, wherein the first grouping is identified by accessing an extensible markup language (XML) file.

11. The computer readable medium of claim 9, wherein the instructions, if executed, further result in:
   if the network component configuration is invalid at one of the various times, generating a new electronic file representing an alternative network component configuration and storing the new electronic file in place of the previous electronic file to cause subsequent orders to be based on the alternative network component configuration.

12. A system, comprising:
   a host computer configured to receive a network component configuration and to determine if the network component configuration is valid or invalid based on a comparison of the network component configuration to a first grouping of network component configurations that are supported at a time that the network component configuration is received, wherein the network component configuration is valid if the network component configuration matches the first grouping of network component configurations or invalid if the network component configuration does not match the first grouping of network component configurations;
   the host computer configured to cause data representing the network component configuration to be stored for subsequent analysis;
   the host computer configured to transmit a valid configuration indicator when said comparison identifies said match;
   the host computer configured to access the stored data at various times after the host computer has transmitted an initial indication that the network component configuration is valid, to further determine if the network component configuration remains valid or invalid based on a comparison of the network component configuration to a second grouping of network component configurations that are supported at the subsequent various times, wherein the network component configuration remains valid if the network component configuration matches the second grouping of network component configurations or invalid if the network component configuration does not match the second grouping of network component configurations;
   wherein the various times occur before receiving, at the host computer, new transmissions associated with order activity for the network component configuration; and
   the host computer configured to output a notification if an invalid result is obtained initially or at one of the various times to prevent submission of an invalid order.

* * * * *